(12) United States Patent
Yuan et al.

(10) Patent No.: US 12,709,257 B2
(45) Date of Patent: Aug. 18, 2026

(54) ELECTRO-HYDRAULIC HYBRID BRAKING SYSTEM FOR VEHICLE

(71) Applicant: BETHEL AUTOMOTIVE SAFETY SYSTEMS CO., LTD., Wuhu (CN)

(72) Inventors: Yongbin Yuan, Wuhu (CN); Sheng Zhang, Wuhu (CN); Gaochao Zhang, Wuhu (CN); Qifei Feng, Wuhu (CN)

(73) Assignee: BETHEL AUTOMOTIVE SAFETY SYSTEMS CO., LTD., Wuhu City (CN)

( * ) Notice: Subject to any disclaimer, the term of this patent is extended or adjusted under 35 U.S.C. 154(b) by 869 days.

(21) Appl. No.: 18/008,965

(22) PCT Filed: Feb. 5, 2021

(86) PCT No.: PCT/CN2021/075499
§ 371 (c)(1),
(2) Date: Dec. 7, 2022

(87) PCT Pub. No.: WO2021/248927
PCT Pub. Date: Dec. 16, 2021

(65) Prior Publication Data

US 2023/0234545 A1 Jul. 27, 2023

(30) Foreign Application Priority Data

Jun. 8, 2020 (CN) ......................... 202010514047.5

(51) Int. Cl.
*B60T 13/74* (2006.01)
*B60T 8/1755* (2006.01)
(Continued)

(52) U.S. Cl.
CPC ............ *B60T 13/58* (2013.01); *B60T 8/1755* (2013.01); *B60T 8/92* (2013.01); *B60T 13/686* (2013.01);
(Continued)

(58) Field of Classification Search
CPC ............. F16D 2123/00; F16D 2121/24; F16D 2131/02; F16D 2131/00; B60T 8/1755;
(Continued)

(56) References Cited

U.S. PATENT DOCUMENTS

2014/0015310 A1* 1/2014 Hanzawa ............. B60T 13/741
303/3
2017/0291585 A1* 10/2017 Kobune ................ F16D 55/226

FOREIGN PATENT DOCUMENTS

CN 105172771 A 12/2015
CN 109552287 A 4/2019
(Continued)

*Primary Examiner* — Nicholas J Lane
(74) *Attorney, Agent, or Firm* — IPRTOP LLC

(57) ABSTRACT

An electro-hydraulic hybrid braking system for a vehicle is disclosed. The system includes multiple wheel-end braking modules (1), a hydraulic control module (2), a first electronic control module (3), and a second electronic control module (4). Each of the wheel-end braking modules (1) includes a hydraulic piston (10), a motor (8), and a speed-reducing transmission mechanism (9) configured to convert a rotary motion from the motor (8) into a linear motion for driving the hydraulic piston (10) or brake friction plates (12) to move forwards. The hydraulic piston (10) is movably arranged, and is movable forwards through brake hydraulic pressure. The motor (8) is controlled by the first electronic control module (3) and/or the second electronic control module (4). The electro-hydraulic hybrid braking system for a vehicle is applicable to a vehicle braking system for intelligent driving.

9 Claims, 2 Drawing Sheets

(51) Int. Cl.

| | |
|---|---|
| ***B60T 8/92*** | (2006.01) |
| ***B60T 13/58*** | (2006.01) |
| ***B60T 13/68*** | (2006.01) |
| ***B60T 17/22*** | (2006.01) |
| ***F16D 65/18*** | (2006.01) |
| *F16D 121/24* | (2012.01) |
| *F16D 125/34* | (2012.01) |
| *F16D 127/02* | (2012.01) |
| *F16D 127/06* | (2012.01) |

(52) U.S. Cl.
CPC ............ *B60T 13/746* (2013.01); *B60T 17/22* (2013.01); *F16D 65/18* (2013.01); *B60T 2270/402* (2013.01); *B60T 2270/406* (2013.01); *F16D 2121/24* (2013.01); *F16D 2125/34* (2013.01); *F16D 2127/02* (2013.01); *F16D 2127/06* (2013.01)

(58) Field of Classification Search
CPC ........ B60T 8/92; B60T 13/686; B60T 13/746; B60T 17/22
See application file for complete search history.

(56) References Cited

FOREIGN PATENT DOCUMENTS

| | | | |
|---|---|---|---|
| CN | 110562227 | A | 12/2019 |
| CN | 111923887 | A | 11/2020 |
| CN | 212401166 | U | 1/2021 |
| KR | 20120136860 | A | 12/2012 |

* cited by examiner

ELECTRO-HYDRAULIC HYBRID BRAKING SYSTEM FOR VEHICLE

CROSS REFERENCE TO RELATED PATENT APPLICATION

The present application is the US national stage of PCT/CN2021/075499 filed on 2021 Feb. 5, which claims the priority of the Chinese patent application No. 202010514047.5 filed on 2020 Jun. 8, which application is incorporated herein by reference.

TECHNICAL FIELD

The present disclosure relates to the technical field of vehicle braking systems, in particular, to an electro-hydraulic hybrid braking system for a vehicle.

BACKGROUND

With the development of intelligent driving and active safety braking technologies, the unmanned driving technology has become the mainstream development direction. Unmanned driving requires that a system realizes deceleration and stop in response to a command of an automatic driving controller in any circumstances. In current vehicle braking systems, a booster generates hydraulic pressure, which is transferred to a caliper to generate a braking force for braking. During implementation of active driving functions such as automatic driving, if a hydraulic braking system of a vehicle fails, for example, a power source of the hydraulic braking system fails or a hydraulic pipeline of the hydraulic braking system leaks), the vehicle cannot generate braking deceleration in time in response to the braking command of the automatic driving controller, which results in a braking failure.

Based on the above problem, in an improved solution of the current braking system, two hydraulic braking systems usually including an eBooster and an Electronic Stability Program (ESP) that are standby for each other are used. Both of the systems are hydraulic systems, which may simultaneously fail. In this case, an electronic parking brake (EPB) caliper in the current vehicle may be used for auxiliary braking. However, since the EPB caliper acts only on front or rear wheels, the vehicle cannot be decelerated to the largest extent. In addition, the EPB caliper has problems such as a large idle travel and a small action speed, which causes slow deceleration response of the vehicle.

SUMMARY

The present disclosure provides an electro-hydraulic hybrid braking system for a vehicle, to improve the driving safety of vehicles.

The electro-hydraulic hybrid braking system for the vehicle includes multiple wheel-end braking modules, a hydraulic control module, a first electronic control module, and a second electronic control module. Each of the wheel-end braking modules includes a hydraulic piston, a motor, and a speed-reducing transmission mechanism configured to convert a rotary motion from the motor into a linear motion for driving the hydraulic piston or brake friction plates to move forwards, the hydraulic piston is movably arranged, and is movable forwards through brake hydraulic pressure, and the motor is controlled by the first electronic control module and/or the second electronic control module.

The motor is electrically connected to the second electronic control module, the second electronic control module includes four motor control circuits, and each of the motor control circuits of the second electronic control module exclusively controls the motor of one of the wheel-end braking modules to operate.

The speed-reducing transmission mechanisms of at least two of the four wheel-end braking modules have a self-locking function, the speed-reducing transmission mechanisms of the other wheel-end braking modules do not have the self-locking function; the speed-reducing transmission mechanisms with the self-locking function are disposed at left and right ends of a front axle or a rear axle of the vehicle, after a driving voltage of the motor of the corresponding wheel-end braking module is removed, the brake friction plates maintain elastic deformation and a braking force remains; and after a driving voltage of the motor of the wheel-end braking module in which each of the speed-reducing transmission mechanism without the self-locking function is located is removed, the brake friction plates are restored from the elastic deformation and the braking force decreases.

Motors of the wheel-end braking modules in which the speed-reducing transmission mechanisms with the self-locking function are located are controlled by the first electronic control module and the second electronic control module, the first electronic control module and the second electronic control module each include an motor control circuit or share one motor control circuit, the first electronic control module controls the motors of the wheel-end braking modules in which the speed-reducing transmission mechanisms with the self-locking function are located in a normal state, and the second electronic control module controls the motors of the wheel-end braking modules in which the speed-reducing transmission mechanisms with the self-locking function are located when the first electronic control module is faulty.

The second electronic control module monitors the state of the first electronic control module in at least two different communication manners, and when it is determined through both of the two communication manners that the first electronic control module is unable to control the motors of the wheel-end braking modules in which the speed-reducing transmission mechanisms with the self-locking function are located, the motors of the wheel-end braking modules in which the speed-reducing transmission mechanisms with the self-locking function are located are controlled by the second electronic control module instead.

The hydraulic control module provides the brake hydraulic pressure to the hydraulic piston, and the hydraulic control module comprises a hydraulic circuit control valve and a hydraulic pump. The hydraulic pump is an electric pump, the hydraulic circuit control valve and the hydraulic pump are electrically connected to the first electronic control module, and the first electronic control module controls a braking force of each of the wheel-end braking modules through the hydraulic circuit control valve and the hydraulic pump according to a pressure demand of the wheel-end braking module.

When the hydraulic control module fails to provide the brake hydraulic pressure to the hydraulic piston, the motor operates so that each of the wheel-end braking modules generates a braking force.

The hydraulic control module and the motor of each of the wheel-end braking modules are configured to operate simultaneously, the hydraulic control module provides the brake hydraulic pressure to the hydraulic piston, and the speed-reducing transmission mechanism converts the rotary motion from the motor into the linear motion for driving the hydraulic piston or the brake friction plates to move forwards, to jointly generate a braking force.

When a required braking force is in a first set range, the hydraulic control module provides the brake hydraulic pressure to the hydraulic piston to cause the hydraulic piston to move forwards; and when the required braking force is in a second set range that is greater than the first set range, the motor starts to operate, and the speed-reducing transmission mechanism converts the rotary motion from the motor into the linear motion for driving the hydraulic piston or the brake friction plates to move forwards, to drive the brake friction plates to move forwards, thereby generating a braking force.

The first electronic control module and/or the second electronic control module control, according to control requirements of the vehicle, control the wheel-end braking modules to generate different braking forces on left and right wheels or a single wheel of the vehicle, to control the left and right wheels of the vehicle to generate a wheel speed difference.

The present disclosure is applicable to a vehicle braking system for intelligent driving. By providing the four wheel-end braking modules each including the motor and hydraulic control, when a hydraulic control system or a motor control system fails such that a braking force cannot be automatically generated, the other system can automatically generate a braking force to slow down the vehicle, thereby improving the driving safety and meeting the braking requirement of intelligent driving.

BRIEF DESCRIPTION OF THE DRAWINGS

This specification comprises the following accompanying drawings, which are respectively shown as follows.

Figure 1:
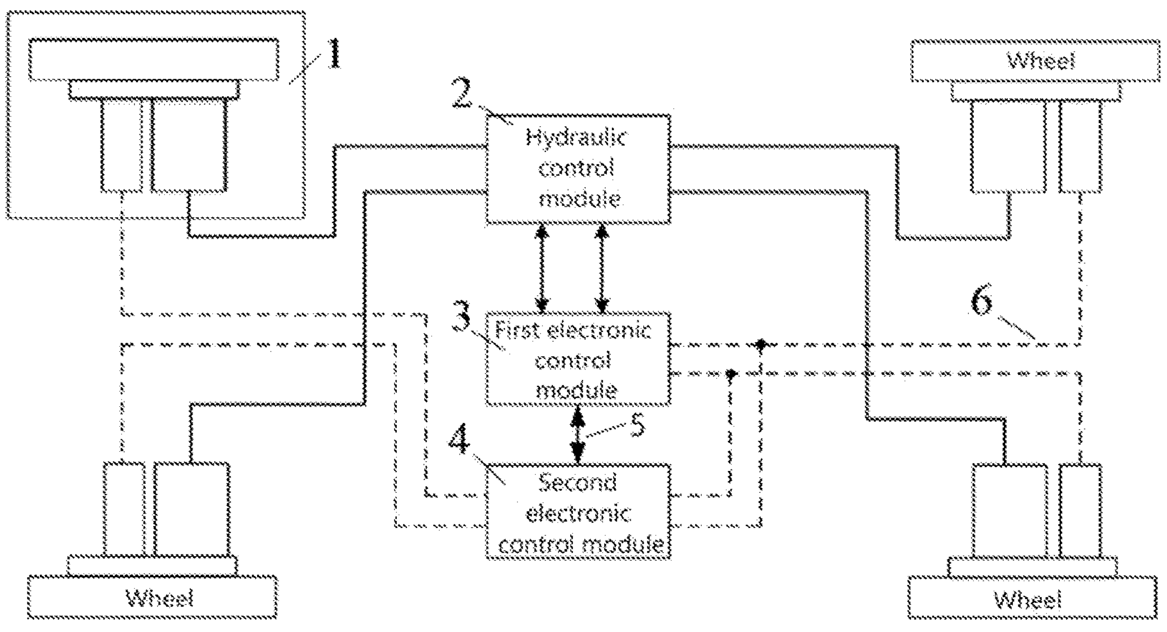
FIG. 1 is an architecture diagram of an electro-hydraulic hybrid braking system for a vehicle according to the present disclosure.

Reference numerals: 1. Wheel-end braking module; 2. Hydraulic control module; 3. First electronic control module; 4. Second electronic control module; 5. Communication interface between first electronic control module and second electronic control module; 6. Wire; 7. Motor control circuit; 8. Motor; 9. Speed-reducing transmission mechanism; 10. Hydraulic piston; 11. Hydraulic chamber; 12. Brake friction plate; 13. Brake disc; 14. Caliper body.

DETAILED DESCRIPTION

The specific implementation of the present disclosure is further described in detail by describing the embodiments below with reference to the accompanying drawings, and the objective is to help a person skilled in the art to have a more complete, accurate and in-depth understanding of the concept and technical solutions of the present disclosure, and contribute to its implementation.

As shown in FIGS. 1 to 4, the present disclosure provides an electro-hydraulic hybrid braking system for a vehicle. The vehicle includes a wheel-end braking module 1, a hydraulic control module 2, a first electronic control module 3, and a second electronic control module 4. A communication interface 5 is disposed between the first electronic control module 3 and the second electronic control module 4. The wheel-end braking module 1 includes a hydraulic piston 10, a motor 8, and a speed-reducing transmission mechanism 9 which converts a rotary motion from the motor 8 into a linear motion for driving the hydraulic piston 10 or brake friction plates 12 to move forwards. Four wheel-end braking modules 1 are provided. The hydraulic piston 10 is movably arranged, and is movable forwards through brake hydraulic pressure. The motor of the wheel-end braking module 1 is controlled by the first electronic control module 3 and/or the second electronic control module 4.

Figure 2:
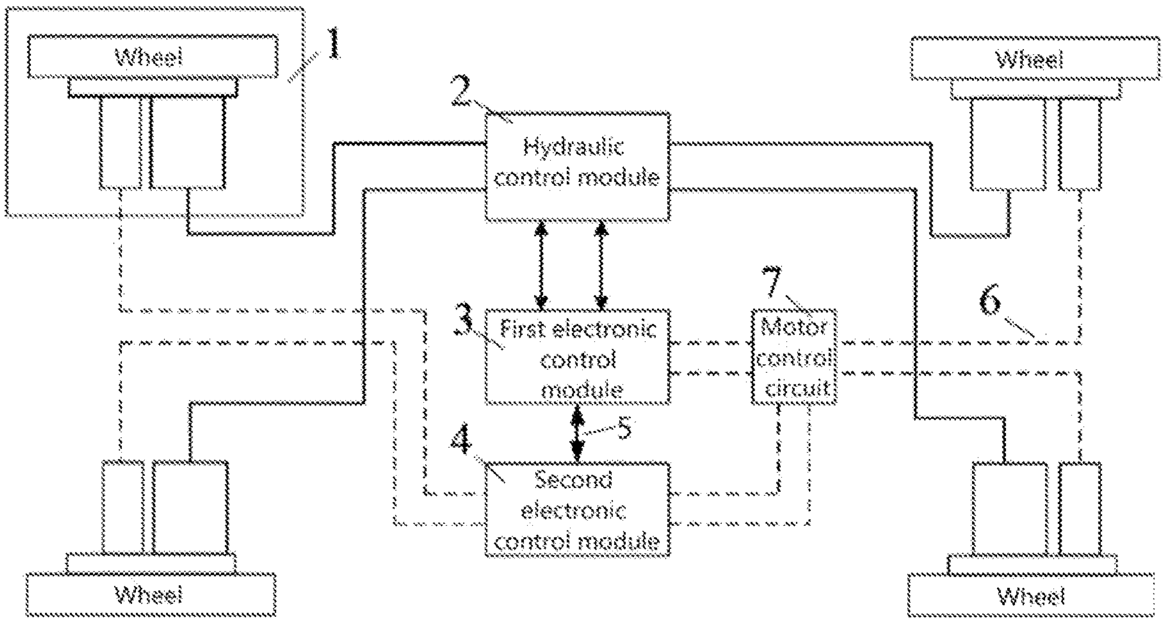
FIG. 2 is another architecture diagram of an electro-hydraulic hybrid braking system for a vehicle according to the present disclosure.

Specifically, as shown in FIG. 1 and FIG. 2, the motor 8 of the wheel-end braking module 1 is electrically connected to the second electronic control module 4, and motors 8 of four wheel-end braking modules 1 are respectively connected to the first electronic control module 3 and the second electronic control module 4 through wires. The second electronic control module 4 has four motor control circuits, and each of the motor control circuits of the second electronic control module 4 can exclusively control the motor 8 of one of the wheel-end braking modules 1 to operate.

As shown in FIG. 1 and FIG. 2, the motors 8 of the four wheel-end braking modules 1 are all connected to the second electronic control module 4. The second electronic control module 4 exclusively controls the motor 8 of each of the wheel-end braking modules 1 to rotate and generate a braking force as required.

As shown in FIG. 1 and FIG. 2, the speed-reducing transmission mechanisms 9 of at least two of the four wheel-end braking modules 1 have a self-locking function, and the speed-reducing transmission mechanisms 9 of the remaining wheel-end braking modules 1 do not have the self-locking function. The speed-reducing transmission mechanisms 9 with the self-locking function are arranged on left and right ends of a front axle or a rear axle of the vehicle, and after a driving voltage of the motor 8 of the corresponding wheel-end braking module 1 is removed, the brake friction plates 12 maintain elastic deformation and a braking force remains. The wheel-end braking modules 1 in which the speed-reducing transmission mechanisms 9 with the self-locking function are located are arranged on the same axle of the vehicle, such as the front axle or the rear axle of the vehicle.

As shown in FIG. 1 and FIG. 2, after a driving voltage of the motor 8 of the wheel-end braking module 1 in which the speed-reducing transmission mechanism 9 without the self-locking function is located is removed, the brake friction plates 12 are restored from the elastic deformation and the braking force decreases.

As shown in FIG. 1, the motor 8 of the wheel-end braking module 1 in which the speed-reducing transmission mechanism 9 with the self-locking function is located is controlled by the first electronic control module 3 and the second electronic control module 4, and the first electronic control module 3 and the second electronic control module 4 each include two exclusive motor control circuits. The first electronic control module 3 controls the motor 8 of the wheel-end braking module 1 in a normal state. That is, when the first electronic control module 3 is not faulty, the first electronic control module 3 controls the motor 8 of the wheel-end braking module 1 to operate. When the first electronic control module 3 is faulty, the second electronic control module 4 controls the motor 8 of the wheel-end braking module 1. The first electronic control module 3 and the second electronic control module 4 each have two motor control circuits. The two motor control circuits of the first electronic control module 3 are respectively electrically connected to the motors 8 of two of the wheel-end braking modules 1 through wires 6. The speed-reducing transmission mechanisms 9 of the wheel-end braking modules 1 have the self-locking function. The two motor control circuits of the second electronic control module 4 are respectively electrically connected to the motors 8 of two of the wheel-end braking modules 1 through wires 6. The speed-reducing transmission mechanisms 9 of the wheel-end braking modules 1 have the self-locking function.

In an implementation variation, as shown in FIG. 2, the motor 8 of the wheel-end braking module 1 in which the speed-reducing transmission mechanism 9 with the self-locking function is located is controlled by the first electronic control module 3 and the second electronic control module 4, and the first electronic control module 3 and the second electronic control module 4 share the same motor control circuit 7. The first electronic control module 3 controls the motor 8 of the wheel-end braking module 1 in a normal state. That is, when the first electronic control module 3 is not faulty, the first electronic control module 3 controls the motor 8 of the wheel-end braking module 1 to operate. When the first electronic control module 3 is faulty, the second electronic control module 4 controls the motor 8 of the wheel-end braking module 1. Two motor control circuits 7 are arranged. The two motor control circuits 7 are respectively electrically connected to the motors 8 of two of the wheel-end braking modules 1. The speed-reducing transmission mechanisms 9 of the wheel-end braking modules 1 have the self-locking function.

As shown in FIG. 1 and FIG. 2, the second electronic control module 4 monitors the state of the first electronic control module 3 in at least two different communication manners. When it is determined through both of the two communication manners that the first electronic control module 3 is unable to control the motor 8 of the wheel-end braking module 1, the motor 8 of the wheel-end braking module 1 is controlled by the second electronic control module 4 instead.

Figure 3:
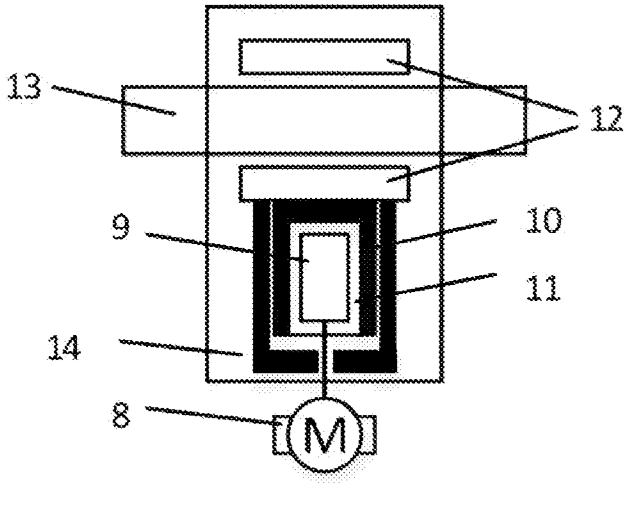
FIG. 3 is a schematic structural diagram of a wheel-end braking module.

As shown in FIG. 3, the wheel-end braking module 1 includes a caliper body 14, a hydraulic piston 10, a motor 8, a speed-reducing transmission mechanism 9, brake friction plates 12, and a brake disc 13. The caliper body 14 has a hydraulic chamber 11 inside for accommodating the hydraulic piston 10. The hydraulic chamber 11 is connected to the hydraulic control module 2 through a brake pipeline. The hydraulic piston 10 is movably arranged inside the caliper body 14. When the hydraulic piston 10 moves forwards, the hydraulic piston 10 can push the brake friction plates 12 to move, so that the brake friction plates 12 clamp the brake disc 13, thereby generating a braking force and realizing braking. The speed-reducing transmission mechanism 9 converts a rotary motion from the motor 8 into a linear motion for driving the hydraulic piston 10 to move forward, so that the hydraulic piston 10 pushes the brake friction plates 12 to move, and then the brake friction plates 12 clamp the brake disc 13, so as to generate a braking force. Alternatively, the hydraulic piston 10 may be pushed by a braking fluid that enters the hydraulic chamber 11, to drive the brake friction plates 12 to generate a braking force. A power input terminal of the speed-reducing transmission mechanism 9 is connected to the motor 8, and a power output terminal of the speed-reducing transmission mechanism 9 is located inside the hydraulic piston 10. During braking, a driving force generated by the motor 8 is transmitted to the hydraulic piston 10 through the speed-reducing transmission mechanism 9, so that the hydraulic piston 10 pushes the brake friction plates 12 to move forwards, which causes the brake friction plates 12 to contact with the brake disc 13, thereby generating a braking force. Meanwhile, the brake hydraulic pressure can drive the hydraulic piston 10 to move forwards. The brake hydraulic pressure and the speed-reducing transmission mechanism 9 jointly act on the hydraulic piston 10, which causes the hydraulic piston 10 to push the brake friction plates 12 to move forwards.

Figure 4:
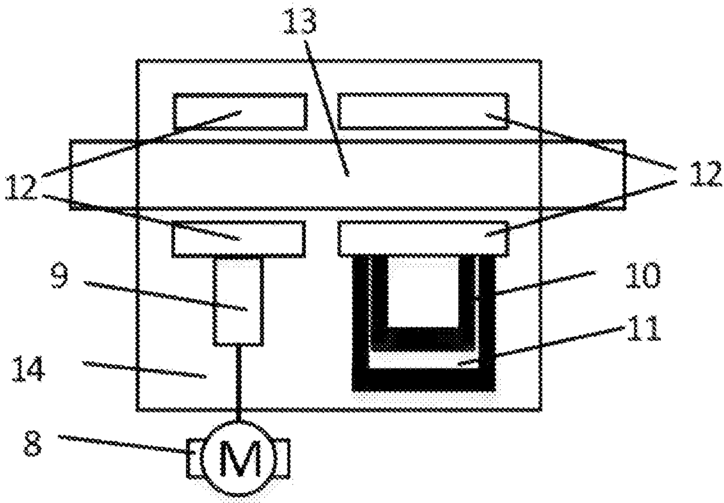
FIG. 4 is a schematic structural diagram of another wheel-end braking module.

In an implementation variation, as shown in FIG. 4, the caliper body 14 has a hydraulic chamber 11 inside for accommodating the hydraulic piston 10. The hydraulic chamber 11 is connected to the hydraulic control module 2 through a brake pipeline. The hydraulic piston 10 is movably arranged inside the caliper body 14. The speed-reducing transmission mechanism 9 converts the rotary motion from the motor 8 into a linear motion for driving one of the brake friction plates 12 to move forwards. The hydraulic piston 10 drives the other of the brake friction plates 12 to move forwards. The motor 8 and the speed-reducing transmission mechanism 9 are arranged on the caliper body 14. During braking, a driving force generated by the motor 8 is transmitted to the brake friction plates 12 through the speed-reducing transmission mechanism 9, to push the brake friction plates 12 to move forwards, which causes the brake friction plates 12 to contact with the brake disc 13, thereby generating a braking force. Meanwhile, the brake hydraulic pressure drives the hydraulic piston 10 to move forwards, so that the hydraulic piston 10 pushes the other of the brake friction plates 12 to move forwards, which causes the brake friction plates 12 to contact with the brake disc 13, thereby generating a braking force.

The hydraulic control module 2 provides the brake hydraulic pressure to the hydraulic piston 10. The hydraulic control module 2 includes a hydraulic circuit control valve and a hydraulic pump. The hydraulic circuit control valve is a solenoid valve. The hydraulic pump is an electric pump. The hydraulic circuit control valve and the hydraulic pump are electrically connected to the first electronic control module 3. The hydraulic circuit control valve and the hydraulic pump are controlled by the first electronic control module 3. The first electronic control module 3 controls a braking force of the wheel-end braking module 1 through the hydraulic circuit control valve and the hydraulic pump according to a pressure demand of the wheel-end braking module 1. When the wheel-end braking module 1 has a demand for braking pressure, the first electronic control module 3 controls the hydraulic pump to pump out a braking fluid, and transfers the braking liquid to the hydraulic piston 10 of the wheel-end braking module 1 through the hydraulic circuit control valve, so as to push the brake friction plates 12 to compress the brake disc 13, thereby generating a braking force.

As shown in FIG. 1 and FIG. 2, when the hydraulic braking of one or more of the wheel-end braking modules 1 fails to generate the braking force, the motor control module controls the motors 8 of the wheel-end braking modules 1 to operate and generate a braking force to compensate for the loss of the hydraulic braking force. When a hydraulic leakage occurs to a wheel of the vehicle, two conventional braking systems with the same circuit cannot provide further hydraulic braking. At this time, uneven left and right braking forces are caused. The motor 8 of the wheel-end braking module 1 in the present disclosure can continue to generate a braking force for braking. The loss of the hydraulic braking force is compensated to continue to generate a braking force, so that the braking forces on both sides of the vehicle are balanced.

As shown in FIG. 1 and FIG. 2, the hydraulic piston 10 and the motor 8 of wheel-end braking module 1 can operate jointly and simultaneously generate braking forces, which improves the braking force of the vehicle and the response speed of the system. Alternatively, according to the control requirements of the first electronic control module 3 and the second electronic control module 4, when the braking force is low, the hydraulic piston 10 generates a braking force; and when the braking force is high, the motor 8 generates the braking force. When a required braking force is in a first set range, the hydraulic control module 2 provides the brake hydraulic pressure to the hydraulic piston 10 to cause the hydraulic piston 10 to move forwards, thereby generating a braking force. When the required braking force is in a second set range that is greater than the first set range, the motor 8 of the wheel-end braking module 1 starts to operate, and the speed-reducing transmission mechanism 9 converts the rotary motion from the motor 8 into the linear motion for driving the hydraulic piston 10 or the brake friction plates 12 to move forwards, to drive the brake friction plates 12 to move forwards, thereby generating a braking force.

As shown in FIG. 1 and FIG. 2, the first electronic control module 3 and/or the second electronic control module 4 may control, according to control requirements of the vehicle, the wheel-end braking modules 1 to generate different braking forces on left and right wheels or a single wheel of the vehicle, to control the left and right wheels of the vehicle to generate a wheel speed difference, thereby achieving the effect of auxiliary braking.

As shown in FIG. 1 and FIG. 2, the hydraulic control module 2, the first electronic control module 3, and the second electronic control module 4 of the vehicle braking system are designed as the same assembly, such as a Wire Controlled Brake System (WCBS). Alternatively, the hydraulic control module 2 and the first electronic control module 3 may be integrally formed, and the second electronic control module 4 may be designed as a single assembly.

The present disclosure is exemplarily described above with reference to the accompanying drawings. Apparently, the specific implementation of the present disclosure is not limited by the foregoing method. Various insubstantial improvements that are made by using the method concept and technical solutions of the present disclosure, or the foregoing concept and technical solutions of the present disclosure that are directly applied to other occasions without improvements shall fall within the protection scope of the present disclosure.

What is claimed is:

1. An electro-hydraulic hybrid braking system for a vehicle, comprising a plurality of wheel-end braking modules, a hydraulic control module, a first electronic control module, and a second electronic control module, wherein each of the plurality of wheel-end braking modules comprises a hydraulic piston, a motor, and a speed-reducing transmission mechanism configured to convert a rotary motion from the motor into a linear motion for driving the hydraulic piston or brake friction plates to move forwards, wherein the hydraulic piston is movably arranged and is movable forwards through brake hydraulic pressure, and the motor of is controlled by the first electronic control module and/or the second electronic control module; wherein speed-reducing transmission mechanisms of at least two of the plurality of wheel-end braking modules have a self-locking function, and speed-reducing transmission mechanisms of the other wheel-end braking modules of the plurality of wheel-end braking modules do not have the self-locking function; wherein the speed-reducing transmission mechanisms with the self-locking function are disposed at left and right ends of a front axle or a rear axle of the vehicle, after a driving voltage of the motor of the corresponding wheel-end braking module is removed, the brake friction plates maintain elastic deformation and a braking force remains; and after a driving voltage of the motor of the wheel-end braking module in which each of the speed-reducing transmission mechanisms without the self-locking function is located is removed, the brake friction plates are restored from the elastic deformation and the braking force decreases.

2. The electro-hydraulic hybrid braking system for a vehicle as in claim 1, wherein the motor is electrically connected to the second electronic control module, wherein the second electronic control module includes four motor control circuits, and each of the motor control circuits of the second electronic control module exclusively controls the motor of one of the plurality of wheel-end braking modules to operate.

3. The electro-hydraulic hybrid braking system for a vehicle as in claim 1, wherein motors of the wheel-end braking modules in which the speed-reducing transmission mechanisms with the self-locking function are located are controlled by the first electronic control module and the second electronic control module, the first electronic control module and the second electronic control module each include a motor control circuit or share a motor control circuit, the first electronic control module controls the motors of the wheel-end braking modules in which the speed-reducing transmission mechanisms with the self-locking function are located in a normal state, and the second electronic control module controls the motors of the wheel-end braking modules in which the speed-reducing transmission mechanisms with the self-locking function are located when the first electronic control module is faulty.

4. The electro-hydraulic hybrid braking system for a vehicle as in claim 3, wherein the second electronic control module monitors a state of the first electronic control module in at least two different communication manners, and when it is determined through both of the two communication manners that the first electronic control module is unable to control the motors of the wheel-end braking modules in which the speed-reducing transmission mechanisms with the self-locking function are located, the motors of the wheel-end braking modules in which the speed-reducing transmission mechanisms with the self-locking function are located are controlled by the second electronic control module instead.

5. The electro-hydraulic hybrid braking system for a vehicle as in claim 1, wherein the hydraulic control module provides the brake hydraulic pressure to the hydraulic piston, and the hydraulic control module comprises a hydraulic circuit control valve and a hydraulic pump, wherein the hydraulic pump is an electric pump, the hydraulic circuit control valve and the hydraulic pump are electrically connected to the first electronic control module, and the first electronic control module controls a braking force of each of the plurality of wheel-end braking modules through the hydraulic circuit control valve and the hydraulic pump according to a pressure demand of the wheel-end braking module.

6. The electro-hydraulic hybrid braking system for a vehicle as in claim 1, wherein when the hydraulic control module fails to provide the brake hydraulic pressure to the hydraulic piston, the motor operates so that each of the plurality of wheel-end braking modules generates a braking force.

7. The electro-hydraulic hybrid braking system for a vehicle as in claim 1, wherein the hydraulic control module and the motor of each of the plurality of wheel-end braking modules are configured to operate simultaneously, the hydraulic control module provides the brake hydraulic pressure to the hydraulic piston, and the speed-reducing transmission mechanism converts the rotary motion from the motor into the linear motion for driving the hydraulic piston or the brake friction plates to move forwards, to jointly generate a braking force.

8. The electro-hydraulic hybrid braking system for a vehicle as in claim 1, wherein when a required braking force is in a first set range, the hydraulic control module provides the brake hydraulic pressure to the hydraulic piston to cause the hydraulic piston to move forwards; and when the required braking force is in a second set range that is greater than the first set range, the motor starts to operate, and the speed-reducing transmission mechanism converts the rotary motion from the motor into the linear motion for driving the hydraulic piston or the brake friction plates to move forwards, to drive the brake friction plates to move forwards, thereby generating a braking force.

9. The electro-hydraulic hybrid braking system for a vehicle as in claim 1, wherein the first electronic control module and/or the second electronic control module control, according to control requirements of the vehicle, the plurality of wheel-end braking modules to generate different braking forces on left and right wheels or a single wheel of the vehicle, to control the left and right wheels of the vehicle to generate a wheel speed difference.

* * * * *